United States Patent [19]

Gomez

[11] Patent Number: 4,942,928
[45] Date of Patent: Jul. 24, 1990

[54] BIDIRECTIONAL MOLDBOARD PLOW WITH ADJUSTABLE TILTING MECHANISM

[75] Inventor: Pompeyo B. Gomez, Monterrey, Mexico

[73] Assignee: Industrias John Deere, S.A. de C.V., Nueno Leon, Mexico

[21] Appl. No.: 261,312

[22] Filed: Oct. 24, 1988

Related U.S. Application Data

[63] Continuation-in-part of Ser. No. 36,430, Apr. 9, 1987, Pat. No. 4,800,963.

[30] Foreign Application Priority Data

Apr. 9, 1986 [MX] Mexico .................................... 2115

[51] Int. Cl.⁵ .............................................. A01B 3/40
[52] U.S. Cl. ........................................ 172/219; 172/439
[58] Field of Search ........ 172/204, 209, 212, 218–223, 172/439, 448, 459, 213, 215

[56] References Cited

U.S. PATENT DOCUMENTS

| | | | |
|---|---|---|---|
| 352,849 | 11/1886 | Ball | 172/219 |
| 375,802 | 1/1888 | Clark | 172/218 |
| 718,831 | 1/1903 | Ehler | 172/219 |
| 2,752,836 | 7/1956 | Pilch | 172/439 X |
| 2,764,075 | 9/1956 | Fowler | 172/219 X |
| 3,042,120 | 7/1962 | Heckathorn et al. | 172/222 X |
| 3,101,789 | 8/1963 | Jennings | 172/219 |
| 3,115,191 | 12/1963 | Ward | 172/219 X |
| 3,305,025 | 2/1967 | Johnson et al. | 172/218 |
| 3,554,294 | 4/1967 | Morkoski | 172/223 |
| 3,557,882 | 4/1968 | Richey | 172/223 |
| 4,019,753 | 11/1975 | Kestel | 172/448 |
| 4,165,787 | 8/1979 | Perkins | 172/219 |
| 4,553,605 | 11/1985 | Katayama et al. | 172/448 X |
| 4,869,327 | 9/1989 | Korf | 172/219 X |

FOREIGN PATENT DOCUMENTS

| | | | |
|---|---|---|---|
| 1368437 | 6/1964 | France | 172/448 |
| 643998 | 8/1962 | Italy | 172/219 |
| 812199 | 3/1981 | U.S.S.R. | 172/219 |
| 912069 | 3/1982 | U.S.S.R. | 172/213 |
| 1603204 | 11/1981 | United Kingdom | 172/439 |

Primary Examiner—Randolph A. Reese
Assistant Examiner—Jeffrey L. Thompson
Attorney, Agent, or Firm—Oblon, Spivak, McClelland, Maier & Neustadt

[57] ABSTRACT

A moldboard plow with a bidirectional moldboard which includes a moldboard frame that can turn by use of a reversal mechanism which also serves as a tilting mechanism. Included is a hitching frame which has a central pole and hitching plates, a moldboard frame having a guide member extending along the longitudinal axis thereof, a set of bidirectional moldboards fastened to the hitching frame by a pivot pin for reversal of the plow so that the bidirectional moldboards cuts into the soil on a right and left side of the plow, a tilting mechanism for tilting said hitching frame and a reversing mechanism connected to the guide member of the moldboard frame for moving the moldboard frame and the set of bidirectional moldboards to the right side and left side of the plow.

13 Claims, 3 Drawing Sheets

BIDIRECTIONAL MOLDBOARD PLOW WITH ADJUSTABLE TILTING MECHANISM

This is a continuation in part of application Ser. No. 036,430, filed Apr. 9, 1987, now U.S. Pat. No. 4,800,963.

BACKGROUND OF THE INVENTION

To break up the soil, moldboard and rotary disk plows are already known and now used. Moldboard plows are widely used in countries with highly developed agriculture. In our country, they have not been used extensively, disk plows being more popular and now used by the majority of farmers. On both types of plows are devices to make the tractor go back and forth and the plow to turn the earth in the same direction.

Disk plows are made up of a series of rotary concave disks mounted individually and supported by a frame; their penetrating effect into the earth occurs mainly from weight although it is also affected by the vertical and horizontal position of the disk.

The width of the cut made by the disk is affected by the size of the disk, since if it is spaced too widely it leaves an area of earth without turning it over by its parabolic cut.

Since the disks are rotary, they allow a bidirectional operation solely by reversing the direction the disk faces.

To compensate for the lateral force of the disk and to control the depth, these plows require a rear wheel.

Of course, the disadvantage of fixed disk plows is that the farmer must plow the field by making turns from the edges to the center of the field, while reversible plows allow the earth to be worked parallel back and forth, creating equal furrows without leaving free spaces.

Now, moldboard plows for their part can have a single set of moldboards that can turn the earth only in one direction and it is necessary to work in strips or series of parallel furrows, leaving the surface uneven.

There are designs for moldboards of different speeds, widths of cut and types of soil. The bodies of the moldboards occasionally require a disconnecting device for uneven ground with stumps, rocks or hard strips. Each moldboard requires a wear plate or heel to compensate for the lateral force and to control the depth.

The moldboards of present plows are fastened to supports and the latter in turn are fastened to the main frame. Their effect of penetration into the soil is achieved by suction when pulled by the tractor, not having limitations of cutting width and they do not leave the earth without turning it over, since their cut is straight.

There are also plows with two sets of left and right moldboards which permit a reversible action, since the tractor can reverse direction and, despite this, the earth can be turned on the same side, which makes it possible to start the work at one end of the land and end at the other, resulting in a better leveled surface.

However, the disadvantage of the reversible plows with two sets of moldboards is that the stability of the tractor is limited, due to the additional weight of the extra set of moldboards and in many cases the tractive power of the tractor is wasted for the reason described above.

SUMMARY OF THE INVENTION

With the intention of combining the advantages of a plow with a single set of moldboards and to avoid said disadvantages, a reversible bidirectional moldboard plow has been invented which constitutes an improvement by virtue of which it has the characteristic of turning of the frame and a bidirectional functioning and also has the advantages of the plow with right and left moldboards, which provide a straight cut without limitations of the cutting width.

The reversible bidirectional moldboard plow makes it possible to form a plow with a single set of moldboards and consequently there is a reduction of weight, an increase in the stability of the tractor and better use of the power of the tractor, thus obtaining greater productivity of the plow.

The bidirectional moldboards are fastened to a support and the latter in turn to a frame bolted and joined to a hitching frame.

This plow with bidirectional moldboards, which constitutes an improvement over prior plows, has the further advantage of being able to cut on the right and left with the same moldboard.

With this bidirectional moldboard a plow can be made with one or more moldboards that can be hitched to a tractor totally with three-point hitch, or can be drawn by a tractor drawbar; further the moldboards can be made for various widths of cut, speeds or soil texture.

When the moldboard is moved under the soil, it will cut a strip of land which by the curved, tilted arrangement of the moldboard will be turned and broken up, making it possible to incorporate harvest remains, exposing pests and weeds to the weather, leaving a preparation for the soil to retain water.

The moldboard will wear out from continuous use and will have to be replaced. However the moldboard can break or crack prematurely from encountering obstacles on the ground. Therefore to reduce breaks or cracks in the moldboard a release mechanism can be provided to permit the plow to pass over the obstacles and the plow being able to be reinstalled automatically or manually to come back to enter the earth. Still there can be failures in the moldboard due to the forces that the moldboard encounters when it is forced to be released.

Therefore, an object of the invention is to provide a moldboard plow that makes it possible to use to the utmost the power of the tractor without its stability being lost and which can be made with simple materials.

The moldboard is made up of a frame welded to sheet metal bent in a curved shape, with the cutting edge at the bottom and points at the ends and a pair of supports in the back part to fasten it to the rod of the frame; also a pair of welded supports to compensate for the lateral force at each end. Also it can be made in individually replaceable segments.

The moldboard can be made for different cutting widths, speeds and types of earth.

The moldboard frame and the bidirectional moldboard have as a main characteristic that of forming a reversible plow with a single set of bidirectional moldboards which makes it possible to cut on the right side and left side with the same moldboard, by turning the moldboard frame by a reversing mechanism and to use an adjustable tilting mechanism to compensate for the depth of the bottom of the furrow from the surface.

The specific characteristics of the plow with a bidirectional moldboard are the following:

1. Reversible plow with a single set of moldboards.

2. Cutting on the right side and left side with the same moldboard.
3. Moldboard reversing mechanism to make possible the change of direction with automatic lock without force.
4. Moldboard with simple curve.
5. Detachable lower segment for straight cut which does not leave the earth without turning it over without limitations of cutting width.
6. Lateral segments detachable at both ends.
7. Protective heel at both ends of the moldboards.
8. Special protective heel at both ends of the last moldboard which performs the functions of the wheel on disk plows.
9. Adjustable tilting mechanism for different depths which makes it possible to compensate for the depth of the bottom of the furrow from the surface in both directions.
10. Moldboard frame with bolted side members.
11. Moldboard support of square steel bar.
12. Welded hitching frame.

BRIEF DESCRIPTION OF THE DRAWINGS

For a better understanding of the invention, reference is made to the accompanying sheets of drawings in which.

DESCRIPTION OF THE PREFERRED EMBODIMENT

Figure 1:
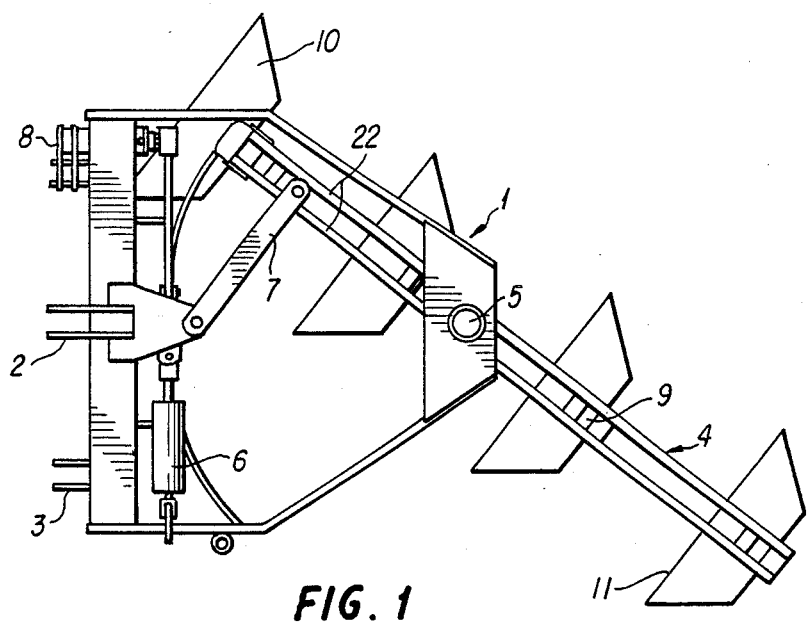
FIG. 1 is a plan view of the moldboard plow, in which the plow is shown with a single set of bidirectional moldboards.

As can be seen in the sheets of drawings, the moldboard plow with a single set of bidirectional moldboards is made up of a hitching frame 1 that has a central pole 2 and hitching plates 3 where the plow is connected to the tractor (not shown).

The plow also has a moldboard frame 4 which is joined to hitching frame 1 by means of a pivot pin 5 which serves to mechanize the reversal of the plow and make bidirectional shares 10 and 11 cut on the right side and left side. Frame 4 includes parallel guides 22, 22 extending along the longitudinal axis thereof.

A reversing mechanism of the moldboard plow is operated by mechanical or hydraulic element 6 that moves reversing arm 7 having a pin member 24 which is positioned within guides 22, 22 to make frame 4 of the bidirectional moldboards travel to the right side and to the left side of the plow so that bidirectional shares 10 and 11 will cut on each side.

The bidirectional moldboard plow has an adjustable tilting mechanism 8 which is also operated by mechanical or hydraulic element 6 which serves to attain different cutting depths of the plow and which makes it possible to compensate for the depth of the furrow from the surface and to obtain a uniform cutting depth in both directions.

Figure 2:
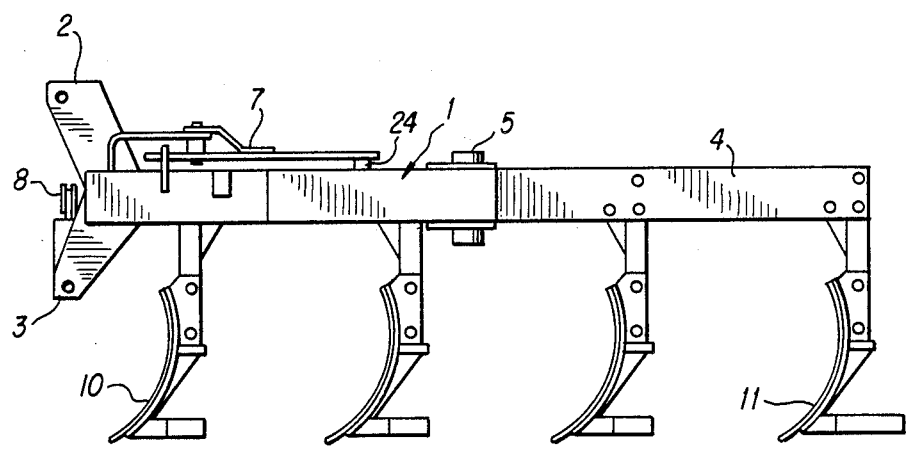
FIG. 2 is a side view of the bidirectional moldboard plow, which is illustrated in FIG. 1 and in which are shown in greater detail the bidirectional moldboards, as well as the support of the moldboards, the moldboard frame and the hitching frame.

Support 9 of the moldboards which is illustrated in FIGS. 1 and 2 serves to fasten bidirectional shares 10 and 11 to moldboard frame 4 to form a bolted unit that pivots on hitching frame 1.

Figure 3:
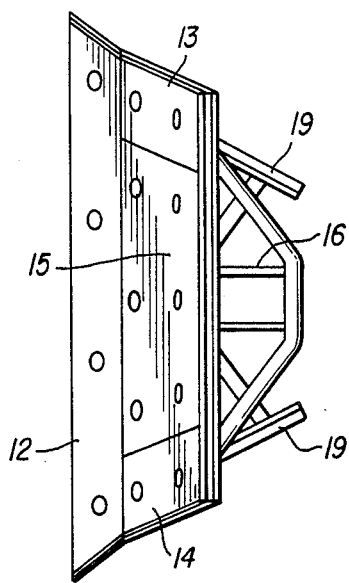
FIG. 3 is a plan view of the bidirectional moldboard which shows the supports and segments of the moldboard.
Figure 4:
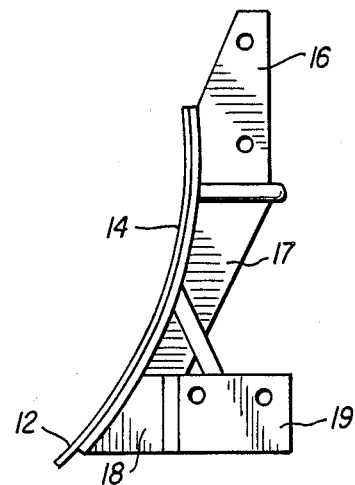
FIG. 4 is a side view of the bidirectional moldboard which is illustrated in FIG. 3 and which shows the parts of the moldboard in greater detail.

In the preferred embodiment of the bidirectional moldboards illustrated in FIGS. 3 and 4, the curved surface is formed by individually replaceable wear segments 12, 13, 14 and 15. Likewise this moldboard is placed at a suitable angle with respect to the drawing line to cut the soil and to make the loosened soil slide, breaking it up and turning it over in a suitable proportion. The surface of the moldboard has a curve to work the earth with a continuous radius except in the area of lower cutting segment 12.

During plowing operation, the sharp-pointed section of lower cutting segment 12 will make the first contact with the soil causing suction, when the moldboard penetrates into the soil, a loosened furrow will be cut, and as the moldboard advances the cut earth will be lifted and flow across curved sections 13, 14 and 15 at a uniform speed, therefore the earth will begin to be parted or cut into blocks when turned over by the curved surface used to work the earth.

Bidirectional moldboards 10 and 11 have as additional components a support body 16 where the moldboard is fastened to moldboard support 9; it further has a curved base 17 that serves for joining of detachable wear segments 12, 13, 14 and 15. The bidirectional moldboard is also made up of two members 18 located on the ends of the moldboard, each of which supports protective heel 19 which in the case of the last bidirectional moldboard 11 is used to stabilize the moldboard plow, performing the same function as a wheel on disk plows.

Figure 5:
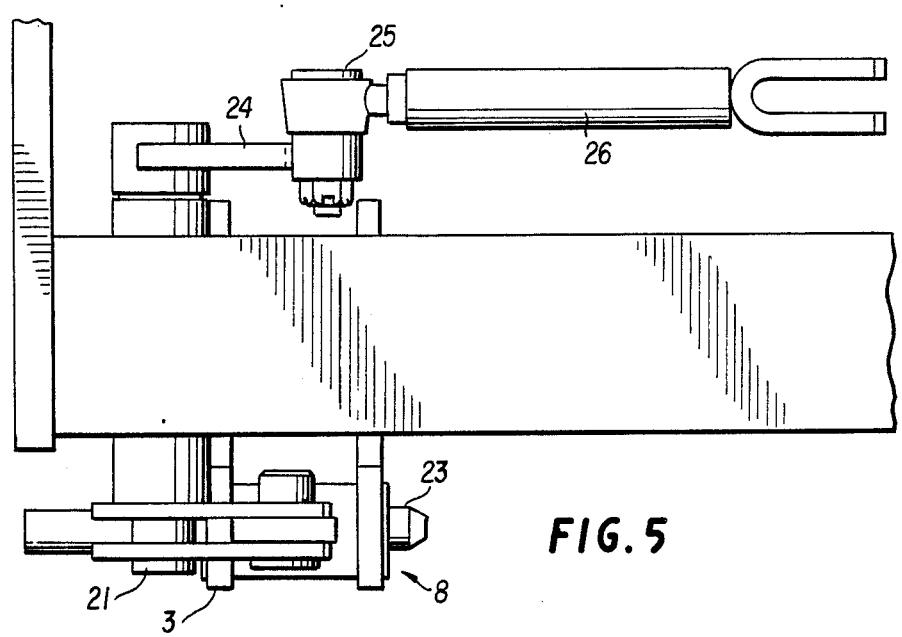
FIG. 5 is a top view of the adjustable tilting mechanism.
Figure 6:
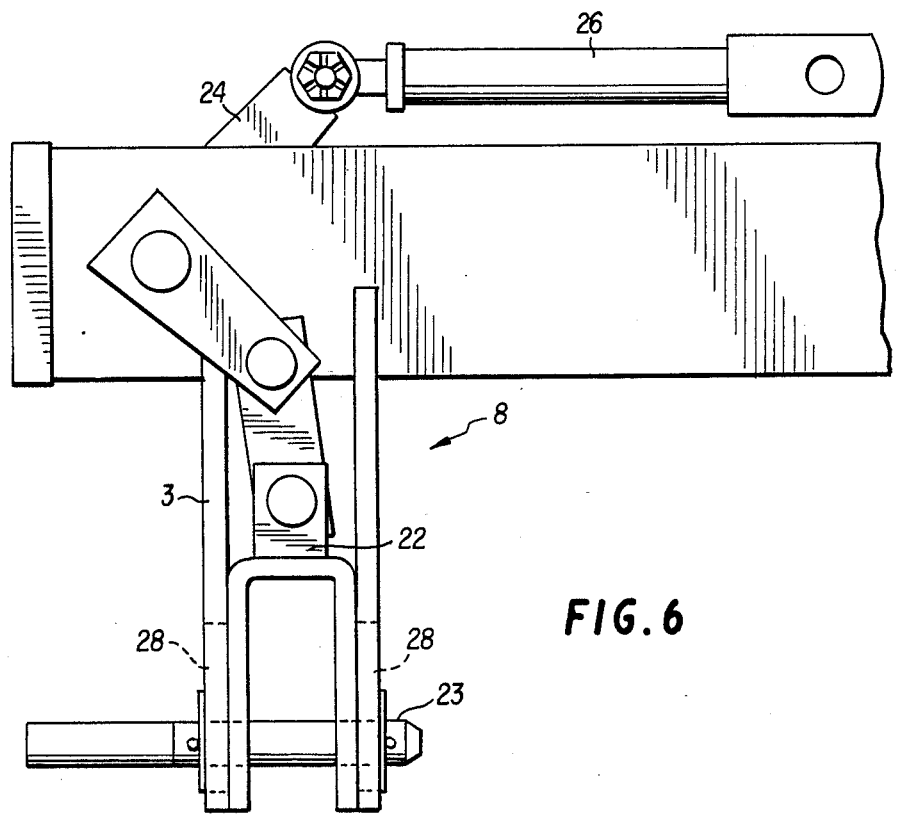
FIG. 6 is a side view of the adjustable tilting mechanism of FIG. 5.

The adjustable tilt mechanism 8 is shown in greater detail in FIGS. 5 and 6. This tilting or leveling mechanism serves to allow for the moldboard plow to make a straight and level cut with the soil surface, even where the tractor is not working in a position level with a surface due to the fact that one rear tire of the tractor is on the bottom of a furrow which was formed due to the previous running of the plow. If the moldboard plow is not supplied with a tilting or leveling mechanism 8 in accordance with the present invention, the tractor would have to run on level ground in order to maintain a level position with respect to the plow and which would otherwise cause undesirable forces being applied to the plow. The tilting or leveling mechanism 8 operates simultaneously with the reversing mechanism 20 and includes a pivot shaft 21 pivotably mounted on the hitching frame 1. On one end of pivot shaft 21 is assembled a clevis 22 that connects to the tractor hitch pin 23 and is movable up and down. On the other end of pivot shaft 21 is an arm 24 which receives a tie rod end 25 which in turn is connected with push rod 26 that is actuated mechanically or hydraulically by element 6. Slots 28, 28 are formed on opposite portions of hitching plate 3 and within which is movably positioned hitch pin 23 so as to guide hitching plate 3 in its upward and downward movement upon actuation of pivot shaft 21, causing the corresponding movement of clevis 22.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A moldboard plow comprising:
   a hitching frame having a first and second hitching plate;
   a moldboard frame connected to said hitching frame;
   a plurality of moldboards fastened to said moldboard frame, said moldboards being bidirectional and being attached to said moldboard frame such that they are rotationally rigid relative to the moldboard frame; and
   an adjustable tilting means mounted on said hitching frame for tilting said hitching frame about a generally longitudinal axis.

2. Improvements in a moldboard plow, as claimed in claim 1, wherein said adjustable tilting mechanism comprises a pivot shaft pivotally mounted on said hitching frame; and
   means mounted on said hitching frame for pivoting said pivot shaft and for tilting said hitching frame upon pivoting of said pivot shaft.

3. The invention as set forth in claim 1 including an actuatable hydraulic cylinder connected between the hitching frame and the moldboard frame for challaging the direction of the moldboards, wherein the adjustable tilting means is responsive to the actuation of the hydraulic cylinder to automatically tilt the hitching frame.

4. A moldboard plow comprising:
   a hitching frame having a first and second hitching plate, at least one of said hitching plates having a slotted portion within which a hitch pin is positioned, said hitch pin being connected to a clevis which moves relative to said slotted hitch plate when said hitching frame is tilted;
   a moldboard frame connected to said hitching frame;
   a plurality of moldboards fastened to said moldboard frame; and
   an adjustable tilting means mounted on said hitching frame for tilting said hitching frame about a generally longitudinal axis, and having a generally vertically oriented pivot shaft mounted on said hitching frame, with means mounted on said hitching frame for pivoting said moldboard frame about the axis of said pivot shaft and for actuating said tilting means upon pivoting of said moldboard frame.

5. A moldboard plow comprising:
   a hitching frame having a first and second hitching plate;
   a moldboard frame connected to said hitching frame;
   a plurality of moldboards fastened to said moldboard frame;
   an adjustable tilting means mounted on said hitching frame for tilting said hitching frame about a generally longitudinal axis;
   wherein said moldboard frame includes a guide members extending along a longitudinal axis of said moldboard frame and wherein said moldboards comprise a set of bidirectional moldboards extending along said axis, said moldboard frame being fastened to the hitching frame by a pivot pin for reversible pivoting of the moldboard frame such that said bidirectional moldboards are adapted to cut into the soil on either the right side or the left side of the plow.

6. Improvements in a moldboard plow as set forth in claim 5, which comprises reversing means connected to said guide member of said moldboard frame, said guide member guiding a portion of said reversing means along said longitudinal axis for moving said moldboard frame and said set of bidirectional moldboards by pivoting action to said right side and said left side of said plow and means for simultaneously operating said adjustable tilting mechanism and said reversing means.

7. A moldboard plow comprising:
   a hitching frame;
   a moldboard frame pivotally connected to said hitching frame;
   a plurality of bidirectional moldboards mounted on said moldboard frame such that they are rotationally rigid relative to said moldboard frame; and
   an adjustable tilting means mounted on said hitching frame for tilting said hitching frame about a generally longitudinal axis.

8. The moldboard plow of claim 7 wherein each of said moldboards has a left-side cutting point, a right-side cutting point, and a bottom cutting edge.

9. The moldboard plow of claim 8 wherein said cutting edge is perpendicular to the longitudinal axis of said moldboard frame.

10. The moldboard plow of claim 9 wherein when the rear of said moldboard frame is pivoted to the left side, said left-side cutting point institutes the cut in the earth and when pivoted to the right side, said right-side cutting point institutes the cut in the earth.

11. The invention as set forth in claim 10 including a hydraulic cylinder connected to the moldboard frame for pivoting the moldboard frame, and wherein the adjustable tilting means is responsive to operation of the hydraulic cylinder for tilting the hitching frame in a first direction about the axis when the rear of the moldboard frame is pivoted to the left side and in a second direction about the axis when the rear of the main frame is pivoted to the right side.

12. The moldboard plow of claim 8 wherein said moldboard also has a support means attached to a back side of said moldboard to compensate for the lateral forces at each end of said moldboard.

13. The moldboard plow of claim 7 wherein said adjustable tilting means has means on one end including a hitch pin and a slotted member allowing relative movement therebetween upon tilting of said hitching frame.

* * * * *

REEXAMINATION CERTIFICATE (2193rd)
United States Patent [19]
Gomez

[11] B1 4,942,928

[45] Certificate Issued Jan. 18, 1994

[54] BIDIRECTIONAL MOLDBOARD PLOW WITH ADJUSTABLE TILTING MECHANISM

[75] Inventor: Pompeyo B. Gomez, Monterrey, Mexico

[73] Assignee: Industrias John Deere, S.A. de C.V., Nueno Leon, Mexico

Reexamination Request:
No. 90/002,485, Oct. 16, 1991

Reexamination Certificate for:
Patent No.: 4,942,928
Issued: Jul. 24, 1990
Appl. No.: 261,312
Filed: Oct. 24, 1988

Related U.S. Application Data

[63] Continuation-in-part of Ser. No. 36,430, Apr. 9, 1987, Pat. No. 4,800,963.

[30] Foreign Application Priority Data

Apr. 9, 1986 [MX] Mexico ................................. 2115

[51] Int. Cl.$^5$ .............................................. A01B 3/40
[52] U.S. Cl. ................................ 172/219; 172/439
[58] Field of Search ........................... 172/219, 439

[56] References Cited

U.S. PATENT DOCUMENTS

| | | |
|---|---|---|
| 300,502 | 6/1884 | Rapp . |
| 352,849 | 11/1886 | Ball . |
| 375,802 | 1/1888 | Clark . |
| 717,087 | 12/1902 | Fairbank . |
| 718,831 | 1/1903 | Ehler . |
| 1,149,720 | 8/1915 | Brown . |
| 2,304,383 | 12/1942 | Strandlund . |
| 2,764,075 | 9/1956 | Fowler . |
| 2,764,076 | 9/1956 | Fowler . |
| 3,042,120 | 7/1962 | Heckathorn et al. ........... 172/210 |
| 3,101,788 | 1/1962 | Jennings ........................... 172/219 |
| 3,115,191 | 12/1968 | Ward . |
| 3,123,150 | 3/1964 | Jennings ........................... 172/219 |
| 3,305,025 | 2/1967 | Johnson et al. .................. 172/218 |
| 3,305,026 | 2/1967 | Fulton ............................... 172/222 |
| 4,019,753 | 4/1977 | Kestel ............................ 280/415 A |

FOREIGN PATENT DOCUMENTS

| | | |
|---|---|---|
| 194482 | 6/1956 | Fed. Rep. of Germany ...... 172/219 |
| 1368437 | of 1964 | France . |
| 2390079 | 1/1979 | France ............................. 172/219 |
| 643998 | 8/1962 | Italy ................................. 172/219 |
| 178786 | of 1922 | United Kingdom . |
| 1497259 | 1/1978 | United Kingdom . |

OTHER PUBLICATIONS

Fundamentals of Machine Operation-Tillage, John Deere Service Publications, 1976, pp. 204, 205, 356.
"John Deere 825 and F210$^H$ Series Plows" Nov. 1, 1960, pp. 6, 8.
"John Deere F510H Heavy Duty, Deep Tillage . . . Plow" Sep. 9, 1960, pp. 8, 22.
"John Deere 303 Heavy Duty . . . Two Way Plow" Jul. 16, 1959, p. 3.
"Pick Up And Go Farming With The John Deere Models 50, 60 and 70 Tractors," Dec. 17, 1953, pp. 3–6, 8.
John Deere "Instruciones de Operacion" (Spanish) Oct. 1986 (Entire Document).
John Deere "Manual Del Operado" (English) Mar. 1987 (Entire Document).
"John Deere No. 822 . . . No. 821 Integral Two-Way . . . Plows," Apr. 5, 1955, pp. 1, 4.
"John Deere DT3 Heavy Duty . . . Truss Frame Plow," 1955, pp. 3, 4.

*Primary Examiner*—Randolph A. Reese

[57] ABSTRACT

A moldboard plow with a bidirectional moldboard which includes a moldboard frame that can turn by use of a reversal mechanism which also serves as a tilting mechanism. Included is a hitching frame which has a central pole and hitching plates, a moldboard frame having a guide member extending along the longitudinal axis thereof, a set of bidirectional moldboards fastened to the hitching frame by a pivot pin for reversal of the plow so that the bidirectional moldboards cuts into the soil on a right and left side of the plow, a tilting mechanism for tilting said hitching frame and a reversing mechanism connected to the guide member of the moldboard frame for moving the moldboard frame and the set of bidirectional moldboards to the right side and left side of the plow.

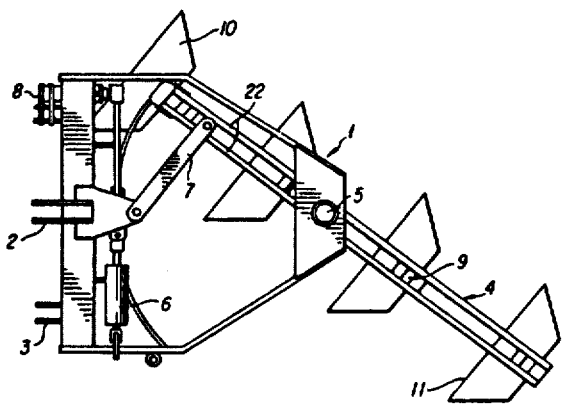

B1 4,942,928

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 39-65:

The adjustable tilt mechanism 8 is shown in greater detail in FIGS. 5 and 6. This tilting or leveling mechanism serves to allow for the moldboard to make a straight and level cut with the soil surface, even where the tractor is not working in a position level with a surface due to the fact that one rear tire of the tractor is on the bottom of a furrow which was formed due to the previous running of the plow. If the moldboard plow is not supplied with a tilting or leveling mechanism 8 in accordance with the present invention, the tractor would have to run on level ground in order to maintain a level position with respect to the plow and which would otherwise cause undesirable forces being applied to the plow. The tilting or leveling mechanism 8 operates simultaneously with the reversing mechanism [20] and includes a pivot shaft 21 pivotably mounted on the hitching frame 1. On one end of pivot shaft 21 is assembled a clevis 22 that connects to the tractor hitch pin 23 and is movable up and down. On the other end of pivot shaft 21 is an arm 24 which receives a tie rod end 25 which in turn is connected with push rod 26 that is actuated mechanically or hydraulically by element 6. Slots 28, 28 are formed on opposite portions of hitching plate 3 and within which is movably positioned hitch pin 23 so as to guide hitching plate 3 in its upward and downward movement upon actuation of pivot shaft 21, causing the corresponding movement of clevis 22.

AS A RESULT OF REEXAMINATION, IT HAS BEEN DETERMINED THAT:

The patentability of claims 1, 2, 4, 7-13 is confirmed.

Claims 3 and 5 are determined to be patentable as amended.

Claim 6, dependent on an amended claim, is determined to be patentable.

3. The invention as set forth in claim 1 including an actuatable hydraulic cylinder connected between the hitching frame and the moldboard frame for [challaging] *changing* the direction of the moldboards, wherein the adjustable tilting means is responsive to the actuation of the hydraulic cylinder to automatically tilt the hitching frame.

5. A moldboard plow comprising:
a hitching frame having a first and second hitching plate;
a moldboard frame connected to said hitching frame;
a plurality of moldboards fastened to said moldboard frame;
an adjustable tilting means mounted on said hitching frame for tilting said hitching frame about a generally longitudinal axis; wherein said moldboard frame includes a guide [members] *member* extending along a longitudinal axis of said moldboard frame and wherein said moldboards comprise a set of bidirectional moldboards extending along said axis, said moldboard frame being fastened to the hitching frame by a pivot pin for reversible pivoting of the moldboard frame such that said bidirectional moldboards are adpted to cut into the soil on either the right side or the left side of the plow.

* * * * *